UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

AZO COLORING-MATTER.

SPECIFICATION forming part of Letters Patent No. 412,440, dated October 8, 1889.

Application filed January 9, 1889. Serial No. 295,867. (Specimens.)

*To all whom it may concern:*

Be it known that I, ARTHUR WEINBERG, doctor of philosophy, a subject of the King of Prussia, and a resident of Frankfort-on-the-Main, Germany, have invented new and useful Improvements in the Manufacturing of New Bluish-Black Coloring-Matters, of which the following is a specification.

This invention relates to a new method of manufacturing bluish-black azo dye-stuffs, and represents an improvement of the method described in the specification forming part of Letters Patent No. 345,901.

In order to carry out my invention, I proceed as follows: I take one of the compounds corresponding to the general formula

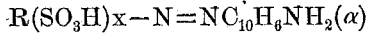

obtained by the reaction of diazo-sulphonic acids on alpha-naphthylamine and convert it into the diazo compound with the necessary quantity of nitrous acid. This diazo-azo compound I then let react upon alpha or beta naphthylamine.

As an example I shall describe the process of carrying out the manufacture of the dark-blue azo coloring-matter called "naphthyl-black." I dissolve thirty-five kilograms naphthylamine disulphonate of sodium (which I get, for instance, by sulphonating naphthylamine or naphthionic acid, or by reducing nitro-naphthaline disulphonic acids, or by heating naphthol-disulphonic acids with ammonia) in three hundred liters of water acidulated with thirty kilograms of muriatic acid, and diazotize by addition of seven kilograms of nitrite of sodium in aqueous solution at a low temperature. Thereupon eighteen kilograms of chlorhydrate of alpha-naphthylamine dissolved in five hundred liters of water are poured into the above mixture while constantly stirring. Hereby the amidoazo compound is formed, which is converted by seven kilograms of nitrite of sodium into the diazo-azo compound. The latter is allowed to act upon 14.3 kilograms naphthylamine dissolved in diluted acid or in alcohol. The coloring-matter thus formed is converted into the sodium salt by carbonate of soda.

Instead of naphthylamine disulphonate I may take the disulphonate of aniline or toluidine or a naphthylamine trisulphonate.

This coloring-matter produces in an acidulated bath dark-blue shades. It dissolves in strong sulphuric acid with a greenish-black color. It is soluble in water and difficultly soluble in spirit. By reducing agents it is destroyed, forming the amido-sulphonic acid and naphthylendiamine.

From naphthol-black (the dye-stuff forming the subject of Letters Patent No. 345,901) my invention differs theoretically by the presence of the anide group, and it differs technically by its greater intensity and the greater resistance of the dyed fabric to washing and milling.

What I claim as my invention, and desire to secure by Letters Patent, is—

As a new article of manufacture, the new coloring-matter of the general formula

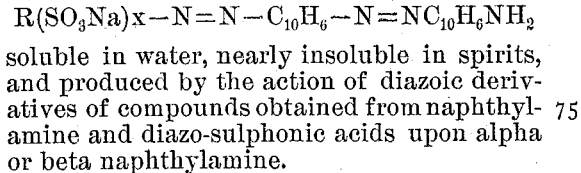

soluble in water, nearly insoluble in spirits, and produced by the action of diazoic derivatives of compounds obtained from naphthylamine and diazo-sulphonic acids upon alpha or beta naphthylamine.

In testimony that I claim the foregoing as my invention I have signed my name, in presence of two witnesses, this 24th day of December, 1888.

ARTHUR WEINBERG.

Witnesses:
ALVESTO S. HOGUE,
THEODOR WILHELM.